F. L. RANDEL.
PRESERVING FOOD.
APPLICATION FILED MAY 2, 1912.
1,039,802.
Patented Oct. 1, 1912.
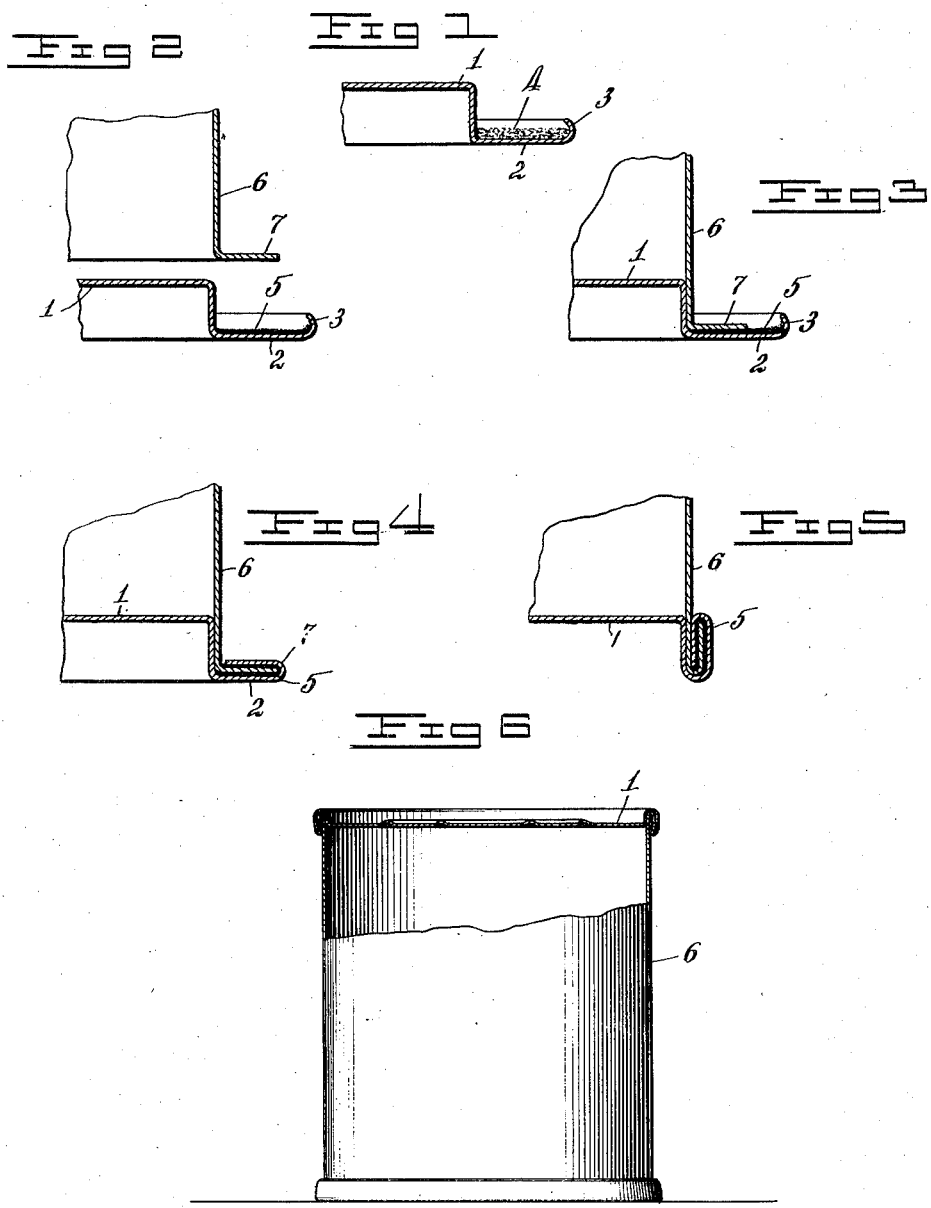
Witnesses
H. C. Robinette
H. Schoenthal.
Inventor
Frank L. Randel
By K. P. McElroy
Attorney

UNITED STATES PATENT OFFICE.

FRANK L. RANDEL, OF BROOKLYN, NEW YORK.

PRESERVING FOOD.

1,039,802.   Specification of Letters Patent.   Patented Oct. 1, 1912.

Application filed May 2, 1912. Serial No. 694,633.

*To all whom it may concern:*

Be it known that I, FRANK L. RANDEL, a citizen of the United States, residing at Brooklyn, in the county of Kings and State of New York, have invented certain new and useful Improvements in Preserving Food, of which the following is a specification.

This invention relates to preserving food; and it comprises a process of preserving food in sealed containers whereby sterilization of food by heat in a container simultaneously effects the formation of a permanent sealing away of such food against contamination, the food for the present purposes being packed in a metal container having crimped joints removed from contact with such foods, said crimped joints being assembled together with a gasketing and joining composition containing uncured rubber and sufficient sulfur for vulcanization and the assemblage being then submitted to heat sufficient to sterilize or "process" such food and to convert said gasketing composition into a strong vulcanized rubber layer permanently sealing and uniting said joints; all as more fully hereinafter set forth and as claimed.

The preserving of food by canning in cans or tins having soldered joints and a solder seal is objectionable because of the practically unavoidable contact of compositions containing lead with the food. Pure tin is practically unattacked by ordinary foods in the absence of air and the same is true of a good quality of tinned steel; but in the presence of lead (solder contains lead) galvanic couples are apt to form with entry of tin or lead, or both, into the food. The presence of these metals in food is, of course, highly objectionable. Many efforts have been made to make a can and effect a seal in other ways than by the use of solder; but in practice they have not sufficed to meet all the many and stringent requirements of a can of food. In a can of food the joints must be airtight, must impart nothing to the food, must give no action with the tin of the tin plate and must be strong enough to stand the rough handling to which canned goods are subjected.

In the present invention I have devised a cheap, simple and ready method of accomplishing the desired ends in which the processing to sterilize the food simultaneously makes a permanent seal in various joints of the container. Having a can body, which may be cylindrical and built of a sheet of tin plate bent into form with the edges crimped together and solder united (this solder being wholly out of contact with the interior), I may assemble it with a bottom plate having a groove in which the edges of the can fit, this groove containing a particular composition, crimp the edges of the bottom into place with the body-edge, fill the can with the desired food, such as corn, fruit, tomatoes, etc., assemble with the filled can in the same manner a grooved cover containing a similar composition, and process the whole. In the processing, the composition is changed into a hard, strong permanent form and the seal is made by the same heat that serves for sterilization or cooking. The sealing material employed for this purpose should be unvulcanized rubber brought into fluent form with a suitable volatile solvent and carrying in suspension the sulfur or other vulcanizing agent necessary to vulcanize the rubber under the heat employed subsequently in processing. The uncured or raw rubber must be brought into solution or fluent form with a suitable volatile solvent. Most of these rubber solvents, like carbon tetrachlorid, chloroform, benzol, carbon bisulfid, etc., possess an offensive or unpleasant odor but they are removed in the present process prior to the assemblage of the can elements. In addition to the suspended vulcanizing material, the rubber solution or varnish may also, and advantageously, carry a filler, or bonding agent, such as magnesia or powdered asbestos. Asbestos is particularly advantageous for the present purposes. Pigment or dye may be used in connection with the composition. This is useful as making the sealing composition of a distinctive color.

In the operation of the present process, the grooved cover and the grooved base are both provided with a layer of such a composition in their respective grooves and are dried at a gentle heat; a heat sufficient to expel the solvent and leave the composition of uncured rubber and potential vulcanizing agent as a thin plastic film in and adhering to the groove, but not sufficient to effect any substantial vulcanization. The body is now placed with a flanged edge in and sealed by this film of the bottom, and the bottom is then crimped up in such a manner as to bring the groove union on the exterior of the can. The can is next filled with the food and assembled in the same way with the grooved top; after which the assemblage is steam heated or processed in the usual way. In this processing, the heat, at least at the exterior of the can, should be enough to vulcanize the rubber; say, 120° C., or over. Admission to the processing apparatus of steam under 45 pounds pressure works well. The processing heat simultaneously sterilizes the food and converts or vulcanizes the rubber and sulfur into cured rubber of any hardness desired; and this cured rubber unites the joints with an air-tight, mechanically strong seal. There is, of course, nothing volatile in the composition prior or subsequent to processing which can give up anything to the food or contaminate it in any way, the volatile solvents having been previously expelled; neither can the composition affect the tin in any way. Sulfur has an action upon tin, but in the described method there is no opportunity for the sulfur to react with the tin of the coating prior to the vulcanization and subsequent to the vulcanization the sulfur is not free. And as the vulcanization is effected subsequent to the contact of the rubber with the metal surfaces to be sealed while the rubber is soft and plastic, the union is absolutely tight and permanent.

It is necessary in the practice of the present invention that the described procedure be followed, since if the vulcanization of the rubber be completed prior to the assemblage of the can parts (as by using vulcanized rubber rings or layers) the union is not sufficient for a good seal and moreover sulfur, and particularly if present in the large excess usual in vulcanized rubber goods, will be volatilized during processing and may attack the tin, forming tin sulfids which are in turn attacked by some moist foods.

While the composition may be varied to a large extent so long as it possesses the characteristics described, it should always comprise rubber, or equivalent vulcanizable material (rubber substitutes) in an uncured state together with just enough sulfur to effect complete, or substantially complete vulcanization, at the described processing heat. And there should be enough volatile solvent to allow the preliminary application of the composition as a fluent film or varnish or cement layer in the cover seam or groove. A good fluent composition for the present purposes may contain about 3 to 10 per cent. good quality raw rubber, plantation or Ceylon rubber being best as being freest of volatile impurities which might give a taste to the food. It may also contain 3 to 10 per cent. of filler which may be magnesium carbonate or powdered asbestos. About 0.5 to 2 per cent. pigment may be employed as it is advantageous in operation to have the film contrast well in color with the tin to which it is applied. Suspended in the composition should be free sulfur in amount about equivalent to 5 to 15 per cent. of the amount of rubber employed; the amount of sulfur differing somewhat with the particular rubber and with the temperature which is to be employed in processing, which is, of course, in the present invention also the vulcanizing temperature. The rest of the composition may be volatile solvent. Benzol is well suited. For example, a good composition for the present purposes suitable for processing corn (which requires a comparatively high long heating) may be made by dissolving 150 pounds of good plantation raw rubber in 2000 pounds of benzol and working in 7 pounds of sulfur, 100 pounds of powdered asbestos and 5 pounds of iron red pigment.

The can body may of course be united with the base in any other way which avoids contact of solder with the can contents; but it is convenient to use the same method of union for the base as is employed with the top.

In the accompanying drawing, I have illustrated, more or less diagrammatically, certain stages of the present process.

In this showing:—Figure 1 is a fragmentary view of a bottom or top showing the composition in place; Fig. 2 is a similar view showing the composition after drying and ready for application; Fig. 3 is a similar view showing the elements of Fig. 2 assembled and ready for seaming together; Fig. 4 is a similar view showing the next stage of seaming; Fig. 5 is a similar view showing a still later stage; and Fig. 6 is a view, partly in vertical section, showing the completed food package.

In the showing of Fig. 1, element 1 is a can cover or bottom provided with a lateral flange 2 having an ear 3. Within this is a layer 4 of fluent rubber composition, ready for drying down. In Fig. 2, this layer has been converted by loss of solvent into a thin adhering film 5 (shown for the purposes of illustration as of exaggerated relative thickness). Shown above the can cover or bottom, is illustrated a cylindrical can body 6 having a lateral flange 7. In Fig. 3, the elements are shown assembled. It will be noted that the rubber film stops at a point remote from the interior of the can. In Fig. 4, the flange of the bottom is shown seamed over the body flange; in Fig. 5 the seaming is carried further, and in Fig. 6, it will be seen that the two flanges have been converted into a neat seam.

While the operation is shown and described as carried on with the bottom of the can, it is obvious that the operation of affixing the top is the same in principle.

What I claim is:—

1. In the preservation of food by sterilization in closed containers, the process which comprises filling a can with food to be sterilized at a given temperature, closing the can by applying a top carrying an adhering film like sealing layer comprising raw rubber and a vulcanizing agent, such composition being one which will vulcanize at said sterilizing temperature, and heating to said temperature to sterilize the food and vulcanize said sealing layer.

2. In the preservation of food by sterilization in closed containers, the process which comprises filling a can with food to be sterilized at a given temperature, preparing a top having a can-engaging surface by applying to said surface a layer of fluent composition comprising raw rubber, a volatile solvent and a vulcanizing agent, the proportion of raw rubber to vulcanizing agent being such as will give an inert and permanent vulcanized rubber at said temperature, and driving off the solvent by a gentle, non-vulcanizing heat to form a vulcanizable sealing layer, closing the can by applying said top and heating the assemblage to said temperature to sterilize the food and vulcanize said sealing layer.

3. In the preservation of food by sterilization in closed containers, the process which comprises preparing a can bottom and can top having can body-engaging surfaces by applying to said surfaces layers of a fluent composition comprising volatile rubber solvent, raw rubber and sufficient vulcanizing agent to vulcanize said rubber in the subsequent sterilization, driving off the volatile solvent by a gentle non-vulcanizing heat to form sealing vulcanizable layers, applying the can body to the bottom, filling the can with the food, applying the top and heating the assemblage to a temperature sufficient to sterilize the food and vulcanize the sealing layers.

In testimony whereof, I affix my signature in the presence of two subscribing witnesses.

FRANK L. RANDEL.

Witnesses:
H. O. CHUTE,
MARION L. LARMER.